United States Patent

[11] 3,572,621

| [72] | Inventors | Frank I. Whitten<br>Bethesda;<br>Charles E. Strother, Rockville; Joseph Gesswein, Bethesda, Md. |
|---|---|---|
| [21] | Appl. No. | 763,145 |
| [22] | Filed | Sept. 27, 1968 |
| [45] | Patented | Mar. 30, 1971 |
| [73] | Assignee | The United States of America as represented by the Secretary of the Navy |

[54] SHOCK MITIGATING SPRING AND DETENT PEDESTAL
3 Claims, 9 Drawing Figs.

[52] U.S. Cl. ................................................ 248/20,
248/358, 267/178
[51] Int. Cl. ............................................. F16f 15/00
[50] Field of Search............................................ 267/(178),
1; 248/20, 21, 401, 24, 402, 358, 350, 403;
188/102

[56] References Cited
UNITED STATES PATENTS

| 2,029,977 | 2/1936 | Anderson................. | 267/1UX |
| 2,540,525 | 2/1951 | Howarth et al. .......... | 248/20X |
| 2,938,726 | 5/1960 | Hunter..................... | 267/1X |
| 3,249,330 | 5/1966 | Preis........................ | 248/358 |

Primary Examiner—Edward C. Allen
Assistant Examiner—J. Franklin Foss
Attorneys—L. A. Miller, Q. E. Hodges and A. Sopp ABSTRACT: A personnel protecting pedestal has two telescoping elements biased apart by a coil spring and held together by a limit stop. A detent prevents telescoping of the elements toward each other until a predetermined shock loading is reached. The force needed to compress the spring is less than the force needed to release the detent, so that upon occurrence of a shock wave, the spring distributes the velocity associated with the shock wave over a period of time longer than the duration of the shock wave, thus reducing the velocity and, therefore, the overall acceleration on the load to be protected.

Patented March 30, 1971 3,572,621

INVENTORS
FRANK I. WHITTEN
CHARLES E. STROTHER
JOSEPH GESSWEIN

BY

ATTORNEYS

Patented March 30, 1971 3,572,621

INVENTORS
FRANK I. WHITTEN
CHARLES E. STROTHER
JOSEPH GESSWEIN

BY
ATTORNEYS

SHOCK MITIGATING SPRING AND DETENT PEDESTAL

The invention described herein may be manufactured and used by or for the Government of the United States of America for governmental purposes without the payment of any royalties thereon or therefor.

BACKGROUND AND SUMMARY

Almost all prior art devices for shock mitigation or absorption employ the spring/dashpot principle. Therefore, such devices require fluid handling systems having fluidtight couplings, lines, chambers, etc., and carefully made orifices, valves, and in some cases, fluid reservoirs, pumps, accumulators and the like. Devices incorporating most or all of the above elements are too expensive to be disposable and are often difficult to repair.

The present invention is a simple, inexpensive device easily repaired and disposable, if necessary. In its broader aspects, a device constructed according to the principles of the present invention employs only two telescoping elements, a coil spring, a stop and a simple detent, to provide effective shock mitigation of a load such as personnel and equipment. The device of the present invention is intended primarily for personnel protection on boats or land vehicles susceptible to shocks from beneath caused by explosions or slamming of the vehicle.

The device of the invention provides shock mitigation by enabling relative movement between the telescoping elements at a much lower acceleration, lower velocity and longer time than the movement of the shock displaced deck or vehicle floor. The distance of travel of the telescoping elements and the force of the spring are chosen so that the shock-caused deck motion is nearly spent as the spring approaches full compression. Therefore, the protected load continues moving under the force of the spring and the load inertia until the spring expands to the limit stop. The load may then free-fall to its initial resting place.

It is, therefore, among the objects of the invention to provide: Simple and inexpensive shock protection apparatus; effective shock mitigation without use of fluid damping; shock mitigation devices of easily repairable nature for protection of personnel and equipment on air, land and sea vehicles susceptible to shock by explosion or slamming; a lightweight shock absorbing device easily deployable on craft singly or in groups for load protection.

BRIEF DESCRIPTION OF THE DRAWINGS

The above objects, as well as features and advantages of the present invention, will be better understood by referring to the accompanying drawings in which.

DETAILED DESCRIPTION

Figure 1:
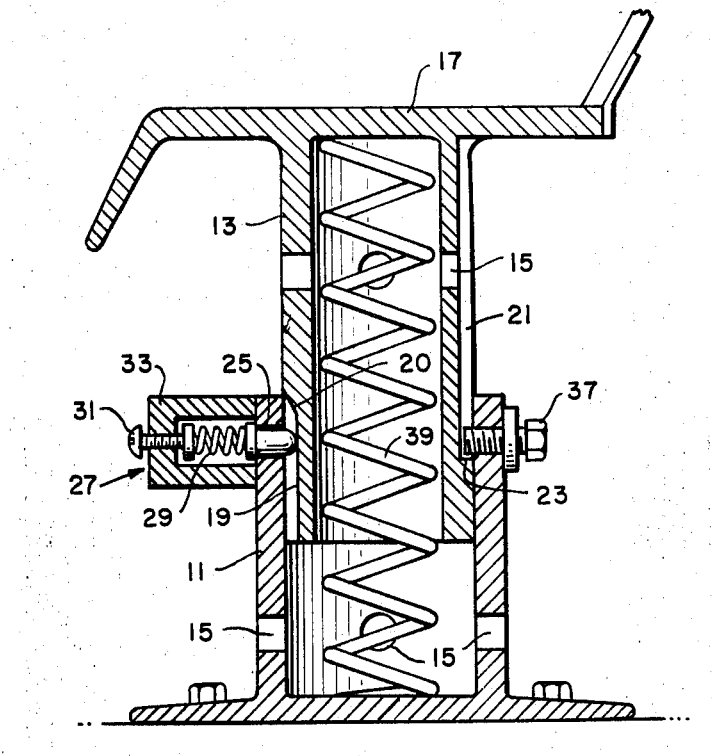
FIG. 1 is a view in longitudinal cross section of a shock mitigator constructed in accordance with the principles of the invention, in the form of a seat and pedestal.

Referring to FIG. 1, a shock mitigation device constructed in accordance with a preferred embodiment of the invention comprises a lower telescoping element 11 for mounting on a base or deck, and an upper telescoping element 13 movable within element 11. Both elements 11 and 13 may be tubular or cagelike in construction and, as shown, may be hollow cylinders each having a plurality of perforations 15 in their respective walls for free and unrestricted passage of air from within and without.

Atop the upper element 13 is a seat 17 or other load support. The lower end of the element 13 terminates, in at least one portion thereof, in a longitudinal slot 19, having at its upper end a chamfered surface 20. Another portion of the upper element 13 has a longitudinal groove 21 which does not extend to the termination of the element 13, but ends at an upward facing internal shoulder 23.

At the upper end of the lower telescoping element 11 is a transverse aperture 25 for receiving therethrough a detent 27. The inner end of the detent engages the chamfered portion 20 of the slot 19. The detent 27 is biased by a spring 29 adjustable by screw 31 to appropriate bias. The screw, detent and spring are housed in a fitting 33 welded or fastened to the wall of element 11 in any suitable manner.

Also located at the upper end of the element 11 is another aperture 35 for receiving a bolt 37 which acts as a limit stop for the inner element 13 by virtue of engagement with shoulder 23, preventing separation of the telescoping elements.

It is understood that there may be several detent and limit stop arrangements disposed around the periphery of element 11 and coacting with element 13.

The telescoping elements 11 and 13 are biased to move apart from each other by a coil spring 39 extending the full inside length of the elements 11 and 13. The coil spring is relatively soft in comparison with the expected shock force, but is sufficiently hard to at least support the load under 1g.

Figure 2:
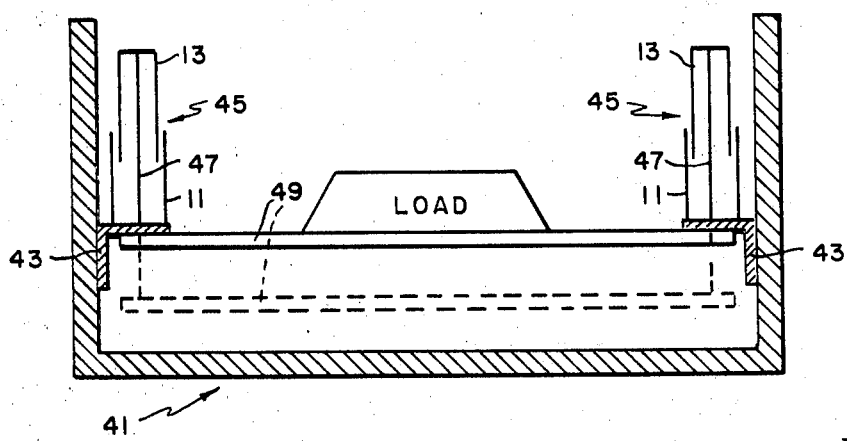
FIG. 2 is a view in modified transverse cross section of a landing or riverine craft employing shock mitigators according to the invention in a group.

In FIG. 2 shock mitigation devices of the invention are shown mounted on a watercraft 41. The sidewalls of the craft may be provided with fittings 43 for supporting shock mitigation 45 of essentially the same design, as that shown in FIG. 1. The mitigators 45 are secured to fittings 43 at their base. A hole is drilled through the base and fitting to enable passage of a rod or cable 47 therethrough, the cable being attached at its upper end to the element 13 and at its lower end, to a load-supporting bench 49.

Comparing FIGS. 1 and 2, and as is explained herein, the operation of the shock mitigating devices is the same although in FIG. 2 the load depends from each of the devices. Of course, the FIG. 2 arrangement may be expanded upon in that as many shock mitigating devices may be employed as desired for load protection.

In assembling the device according to the invention, the detent pressure and spring characteristics are chosen so that in relation to the expected velocity/time displacement of the vehicle or watercraft due to shock, the detent releases at a higher acceleration than the acceleration that the spring induces on the load. For example, where 100 to 200 g. shocks are expected, and the load is a 200 lb. man, the detent may be adjusted to release at about 5 or 6 g., and the spring induce an acceleration of about 3 g. on the load. The travel between telescoping elements should be such that the spring will not fully compress until the velocity of the pedestal is approximately the same in absolute value as that of the vehicle being displaced.

OPERATION

Figure 3A:
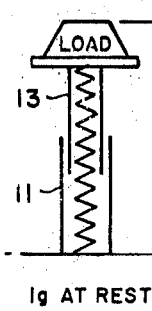
FIGS. 3a—f are explanatory diagrams of the shock mitigator of the invention in various positions in a shock absorbing cycle.

Referring to FIGS. 3a—e and 4, the operation of the device according to the invention, FIGS. 1 and 2, will be explained in relation to its location on a watercraft as affected by an underwater explosion. In FIG. 3a, the device is at rest under force of gravity, 1 g.; the detent is adjusted to release at, say 5 g., the spring when extended exerts 3 g. against the load and the maximum force of the spring when at about full compression is 6 g.

Figure 3B:
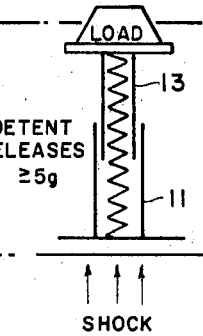

Occurrence of an explosion beneath the watercraft, FIG. 3b, displaces the craft and entire device (with its load) in unison for a very small fraction of a second, the detent 25 releasing at 5 g. Thus the force imparted to the load (e.g. a person in chair 17) does not exceed 5 g. even though the force on the deck of the craft may be 100, 200 g., etc.

Figure 3C:
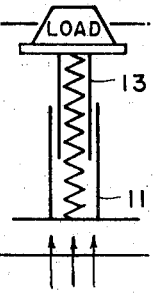
Figure 3D:
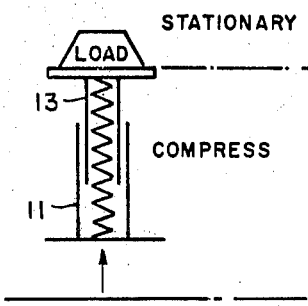

After detent release, the deck moves relative to the load as opposed by the soft, 3 g. spring (FIG. 3c). The travel distance of telescoping elements 11, 13 is sufficient to prevent bottoming of the spring 39 prematurely. When the spring bottoms (reaching maximum compression), FIG. 3d, the load is essentially stationary or moving at a tolerable low velocity and the maximum velocity of the craft deck has already been passed.

Figure 3E:
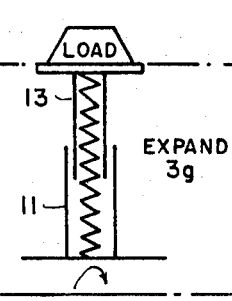
Figure 4:
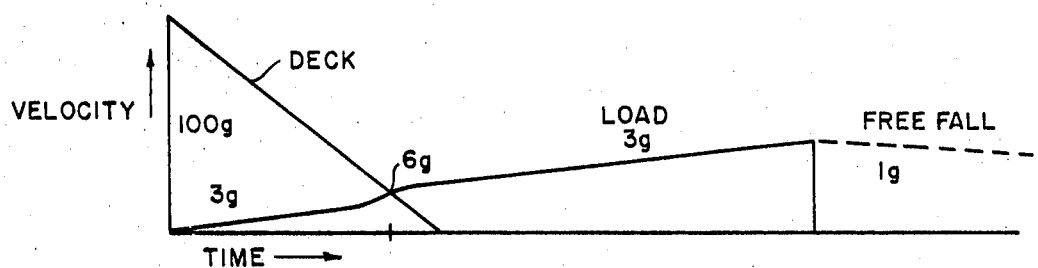
FIG. 4 is a graph of velocity vs. time for explaining the relation between deck motion and motion of a load protected by the device of the invention as the result of shock acting on the deck from below.

As shown in FIG. 4 in which the "deck" and "load" curves of velocity vs. time are so legended, the bottoming of the spring 39 is indicated as occurring at 6 g. After bottoming, the velocity of the deck further decreases while the load, FIG. 3e, is moved under the approximate 3 g. to 6 g. force of the expanding spring. It is recalled that the spring is sufficiently strong to more than support the load. Therefore, the velocity of the load increases slowly under the expansion of the soft spring at about a 3 g. to 6 g. rate for a considerable time after the deck motion becomes negligible, as indicated in FIG. 4.

Figure 3F:
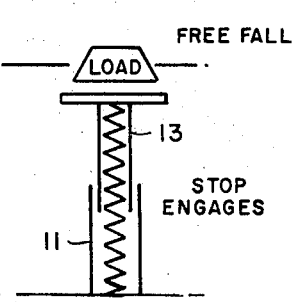

Eventually the spring fully expands, FIG. 3f, at which point the stop 37 engages shoulder 23 bring the motion of the telescoping elements 11, 13 to a halt. The load, if not attached to upper telescoping element 13, is shown in FIG. 3f as continuing its motion in free flight after the elements 11, 13 stop moving. If the load represents a person sitting on element 13, the person free falls at 1 g. until returning to contact with the element. Consequently, the load does not undergo greater than about 6 g. of slow acceleration and 5 g. impact at any time during shock displacement of the watercraft.

It is to be understood that the invention is not limited to the exact details of construction shown and described for obvious modifications will occur to persons skilled in the art.

We claim:

1. Apparatus for mitigating by a free-fall isolation principle the effect of shock on a load carried by a platform which is displaced essentially upward by shock comprising:

essentially upstanding upper and lower telescoping elements, the lower element being attached to the platform, and the upper element carrying in an unattached manner the load to be protected;

each of said telescoping elements comprises a tubular body containing a plurality of venting means through which air may freely pass;

spring means positioned internally of both said telescoping elements for biasing said elements apart;

spring means located in relation to said elements for biasing said elements apart;

the force exerted by said spring means when extended being sufficient to support the load;

at least one detent means releasable at a predetermined force sustainable by the load for holding said elements in an extended position exclusive of the spring means, in said predetermined force being greater than the force exerted by the extended spring means on the load;

at least one limit stop means engaging said telescoping elements for limiting the extent of their movement apart from each other to a position approximately that of the elements when held by said detent means; and whereby upon occurrence of the shock the elements converge after release of the detent means under the load inertia against the resistance of the spring means to a converged position and then diverge under spring force to the extended position at which the detent means reengages and the limit stop halts the motion of the elements while the load continues to move in a free-fall manner, the velocity/time ratio of the load thereby being substantially less than that of the platform.

2. Apparatus according to claim 1 wherein said detent means comprises:

an elongated recess located axially of the upper element and having a downward facing chamfer at the upper end of the recess;

a detent element for engaging the chamfer;

a spring for biasing the detent against the chamfer;

means for adjusting the bias of the spring; and means attached to said lower telescoping element for mounting said detent, spring and said means for adjusting.

3. Apparatus according to claim 2 wherein said limit stop means comprises:

an axial groove in said upper telescoping element and terminating at its lower end in a shoulder; and means attached to the lower telescoping element for extending into the groove and for engaging said shoulder.